United States Patent
Grinfeld

(10) Patent No.: US 8,503,450 B2
(45) Date of Patent: *Aug. 6, 2013

(54) TCP RECEIVER ACCELERATION

(75) Inventor: Ron Grinfeld, Ramat Gan (IL)

(73) Assignee: Broadcom Corporation, Irvine, CA (US)

( * ) Notice: Subject to any disclaimer, the term of this patent is extended or adjusted under 35 U.S.C. 154(b) by 279 days.

This patent is subject to a terminal disclaimer.

(21) Appl. No.: 12/964,388

(22) Filed: Dec. 9, 2010

(65) Prior Publication Data

US 2011/0080912 A1    Apr. 7, 2011

Related U.S. Application Data

(63) Continuation of application No. 11/548,562, filed on Oct. 11, 2006, now Pat. No. 7,856,020, which is a continuation of application No. 10/158,240, filed on May 30, 2002, now Pat. No. 7,142,539.

(60) Provisional application No. 60/294,854, filed on May 31, 2001.

(51) Int. Cl.
*H04L 12/28* (2006.01)

(52) U.S. Cl.
USPC ............... 370/392; 370/400; 370/395.21

(58) Field of Classification Search
USPC ............ 370/400, 389, 392, 396, 397, 395.1, 370/410, 412, 413, 350, 351, 394, 230, 231; 709/238, 220, 223, 227, 242
See application file for complete search history.

(56) References Cited

U.S. PATENT DOCUMENTS

| 6,173,333 | B1 | 1/2001 | Jolitz et al. | |
|---|---|---|---|---|
| 6,226,680 | B1 * | 5/2001 | Boucher et al. | 709/230 |
| 7,142,539 | B2 * | 11/2006 | Grinfeld | 370/392 |
| 7,856,020 | B2 * | 12/2010 | Grinfeld | 370/392 |
| 2004/0103167 | A1 | 5/2004 | Grooters et al. | |

* cited by examiner

*Primary Examiner* — Hanh N Nguyen
(74) *Attorney, Agent, or Firm* — Thomas|Horstemeyer, LLP.

(57) ABSTRACT

A method for processing network information may include performing by one or more processors and/or circuits integrated within a single chip, classifying a header portion of a received packet based on connection context information within the received packet. The connection context information may be acquired by the single chip from a memory external to the single chip. The connection context information for the received packet may be updated based on the classifying. At least a payload portion of the received packet may be communicated to a destination, based on the updated connection context information. The classifying, updating and communicating may be performed asynchronously. The header portion of the received packet may be parsed and/or validated. The connection context information of the received packet may be evaluated.

38 Claims, 5 Drawing Sheets

TCP RECEIVER ACCELERATION

RELATED APPLICATIONS

This application is a continuation of U.S. application Ser. No. 11/548,562 filed on Oct. 11, 2006, which is a continuation of U.S. application Ser. No. 10/158,240 filed on May 30, 2002, issued as U.S. Pat. No. 7,142,539, which claims the benefit of U.S. Provisional Patent Application 60/294,854 filed May 31, 2001, which is assigned to the assignee of the present invention. All of the above applications are incorporated herein by reference in their entireties.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates generally to methods and devices for network communications, and specifically to streamlining operation of reliable communication transport protocols.

The Transmission Control Protocol/Internet Protocol (TCP/IP) suite is a widely-used transport protocol in digital packet networks. The TCP is described by Postel in RFC 793 of the U.S. Defense Advanced Research Projects Agency (DARPA), entitled "Transmission Control Protocol: DARPA Internet Program Protocol Specification" (1981), which is incorporated herein by reference. TCP is a connection-oriented, end-to-end, full-duplex protocol, which provides for reliable inter-process communication between pairs of processes in host computers. The information exchanged between TCP peers is packed into datagrams termed segments, each segment comprising a TCP header followed by payload data. The segments are transported over the network in IP packets.

FIG. 1 is a schematic block diagram depicting a structure of a Transmission Control Protocol (TCP) segment header 10, as is known in the art and specified in RFC 793. Header 10 begins with a source port 10 and a destination port 14, which are 16-bit identifiers respectively indicating the origin and intended destination of the TCP segment. As noted, the TCP is a connection-oriented protocol, signifying that messages are exchanged between two identified end-points, between which a connection has been established. Since the TCP supports multiplexing, i.e., many processes within a single host computer may communicate independently, port numbers are assigned to each process to identify its interface to the TCP. Port numbers are unique within a host computer, however, there is no guarantee of uniqueness across different computers. In order to produce an identifier which is unique throughout all networks, a port identifier is combined with an internet address, generating an identifier termed a socket.

A logical communication channel established between pairs of sockets is termed a connection. Connections are established after a three-way handshake process has completed successfully. An important element in the reliability of the TCP is the use of sequence numbers. Each octet (8 bits) of data transmitted is assigned a sequence number by the sending process. The receiving process is required to acknowledge receipt of of all octets received, by sending an acknowledgment (ACK) verifying the last sequence number successfully received. Sequence numbers provide a way for the sender to identify missing data requiring re-transmission, as well as a way for the receiver to order data which arrives out of sequence. Thus, a sequence number 16 contains a sequence number for a first octet of data in the TCP segment payload. If an ACK flag 24 is set, an acknowledgment number 18 contains the value of the next sequence number the sender of the acknowledgment segment is expecting to receive.

The TCP header contains six flags indicative of additional control information. A RST flag 28 indicates a request to reset the connection. A SYN flag 30 indicates that the segment is part of the three-way handshake process. A PSH flag 26 directs the receiving process to make transmitted data available immediately to the application level without waiting for a timeout or full buffer. A FIN flag 30 indicates that the sender has no more data to send.

An options field 40 provides a way to extend the original protocol while preserving compatibility with earlier implementations. The options field is used to synchronize various parameters during connection establishment, e.g., window scale and maximum segment size. In addition, the options field can convey information which is useful on an established connection, for example a Selective Acknowledgment (SACK) option and a timestamp (TS) option. The SACK option is described by Mathis, et al. in RFC 2018 of the Network Working Group, entitled "TCP Selective Acknowledgment Options" (1996), which is incorporated herein by reference. The SACK option supplements acknowledgment number 18 by providing a way to recover quickly from a single or consecutive set of missing segments by using an additional Acknowledgment number indicating segments received after the missing segments.

The TS option is described by Jacobson, et al. in RFC 1323 of the Network Working Group, entitled "TCP Extensions for High Performance" (1992), which is incorporated herein by reference. The TS option supplies a way to measure round-trip delivery times for segments, i.e., the time between the transmission of a segment and the receipt of an acknowledgment for the segment. This facility allows a TCP implementation to adapt acknowledgment timers to dynamic network behavior.

For the past twenty years, TCP/IP has been implemented as a software suite, typically as a part of computer operating systems. Within the TCP/IP software suite, the TCP receiver function is the largest logical task. A number of authors have suggested strategies for enhancing the performance of TCP receiver processing. For example, Van Jacobson proposed a header prediction algorithm in 1990. The algorithm is described in TCP/IP Illustrated, Volume 2: The Implementation, by Wright and Stevens, section 28.4, pp. 936ff, published by Addison-Wesley, 1995, which is incorporated herein by reference. The header prediction algorithm posits that the majority of incoming TCP segments fall into a single category: segments correctly received, in proper order. For this category of segments, a large part of the TCP receiver logic may be bypassed, thereby greatly streamlining the process. However, notwithstanding this and numerous other improvements, software implementations of TCP receiver logic are limited by operating system performance constraints, as well as inefficiencies deriving from the serial nature of program execution in general-purpose microprocessors and associated overhead.

As long as network speed was the main factor limiting receiver rates, software implementations of TCP receiver logic provided adequate performance levels. However, with the advent of network speeds in the Gbps and 10 Gbps range, this is no longer the case. Faster TCP receiver processing is required. In an attempt to release the resulting bottleneck, attention has turned to the development of a dedicated hardware implementation, or acceleration, of TCP/IP receiver logic. Optimizing a hardware implementation calls for a new approach to the original specification in RFC 793. Among the issues to be addressed are maximization of parallel processing, efficient information passing, and rapid classification and handling of segments.

U.S. Pat. No. 5,056,058, to Hirata et al., whose disclosure is incorporated herein by reference, describes high speed processing of data packets using header prediction. Hirata describes a comparison circuit which forwards packets selectively to either a high speed processing section or a low speed processing section. The prediction is made according to a previously transmitted packet, and the circuit prepares information necessary for a process of receiving a subsequent packet.

U.S. Pat. No. 5,678,060 to Yokoyama et al., whose disclosure is incorporated herein by reference, describes equipment for connecting a computer system to a network. The equipment includes a header retrieval unit which retrieves a header corresponding to the protocol header of a received frame, and uses the retrieved header for predicting a protocol header of a frame to be next received, in correspondence to each of a plurality of connections to the network.

U.S. Pat. No. 5,991,299 to Radogna et al., whose disclosure is incorporated herein by reference, discloses a method for translating frame headers at speeds approximating the reception rate of frames on communication links. The translation uses a dedicated microsequencer which identifies a receive frame encapsulation type and a transmit frame encapsulation type and based on such identification, selects a processing routine which is then executed to translate the frame header. The microsequencer controls the movement of information from an input memory, through a dedicated header processor, to an output memory. The headers of the respective frames are translated within the dedicated header processor to facilitate header translation at high speeds.

U.S. Pat. No. 6,122,670 to Bennett et al., whose disclosure is incorporated herein by reference, is directed to a hardware implementation of TCP/IP packet handing functions. The system includes a computer at a node having a backplane, a CPU board plugged into the backplane, software instructions for the CPU, and a special network board plugged into the backplane. In addition to handling the packets, the system temporally interleaves the processing of different levels of the TCP/IP protocol stack to process a datagram.

U.S. Pat. No. 6,144,996 to Starnes et al., whose disclosure is incorporated herein by reference, describes a system that offers accelerated delivery of content to requestors while guaranteeing, during worst case conditions, a minimum level of service (for content deliver) to the requestors. Utilization of processing resources is monitored and managed so that performance of the system guarantees the minimum level of service.

U.S. Pat. No. 6,173,333 to Jolitz et al., whose disclosure is incorporated herein by reference, describes a network accelerator for TCP/IP which includes mask programmable logic for performing network protocol processing at network signaling rates. Mask programmable logic is stated to be faster and less expensive to construct than available RISC (Reduced instruction set computer) CPU assisted TCP/IP processing boards. The programmable logic is configured in a parallel pipelined architecture controlled by state machines and implements processing for predictable patterns of the majority of transmissions. Incoming packets are compared with patterns corresponding to classes of transmissions which are stored in a content addressable memory, and are simultaneously stored in a dual port, dual bank application memory. Processing of packet headers is performed in parallel and during memory transfers without the necessity of conventional store and forward techniques resulting in a substantial reduction in latency. Packets which constitute exceptions or which have checksum or other errors are processed in software. U.S. Pat. No. 6,179,489 to So, et al., whose disclosure is incorporated herein by reference describes a process for operating a computer system having an operating system, an application program, and a third program. The process uses a first processor having a first instruction set, and a second processor having a second, different, instruction set. The third program establishes message handling functions and bus mastering data transfer operations for the second processor between a host running the operating system and the second processor running the third program.

U.S. Pat. No. 6,208,651 to Van Renesse, et al., whose disclosure is incorporated herein by reference, describes a system which reduces the communication latency of complex layered communication protocols. The system reduces both the message header overhead imposed by layered protocols, and the message processing overhead, by classifying, collecting and aligning the headers. The system also applies pre- and post-processing of a message, packet filtering, and packing and unpacking of messages in cases where a backlog of messages has to be processed.

U.S. Pat. Nos. 6,226,680, 6,247,060 and 6,334,153 to Boucher, et al., whose disclosures are incorporated herein by reference, describe a card associated with a host computer for protocol processing. The card provides a fast-path that avoids protocol processing for some large multipacket messages, and also assists the host for those message packets that are chosen for processing by host software layers. A communication control block for a message is defined that allows data to move, free of headers, directly to or from a destination or source in the host. The card contains specialized hardware circuits that are faster at their specific tasks than a general purpose CPU. The disclosures also describe a trio of pipelined processors with respective processors for transmission, reception, and management processing.

U.S. Pat. No. 6,247,068 to Kyle, whose disclosure is incorporated herein by reference, describes a hardware accelerator for performing protocol acceleration. The accelerator uses hardware decoders each configured to perform decoding for a particular protocol interface. A protocol processor is connected to a data link library and accesses appropriate programs in a data link library to achieve the protocol acceleration.

BRIEF SUMMARY OF THE INVENTION

It is an object of some aspects of the present invention to provide a method and apparatus for partitioning tasks of a Transmission Control Protocol (TCP) receiver so as to optimize implementation of a TCP receiver.

It is a further object of some aspects of the present invention to provide a method and apparatus for partitioning tasks of a TCP receiver among multiple processors.

In preferred embodiments of the present invention, a number of elements are combined in a TCP receiver, to act as a hardware accelerator. The elements comprise: a partition of TCP receiver processing into a number of modules implemented using instruction-level optimization and coupled together in a pipeline architecture; an efficient inter-module information forwarding mechanism; and a fast internal memory holding connection context information, interfaced to an external memory containing established connection control blocks. The receiver uses an architecture suited for implementation as a hardware accelerator, utilizing more than one processor. As a part of a configuration process, a host system comprising the receiver determines whether a given connection is marked for acceleration in the accelerator.

The partition of TCP receiver processing is based on an identification of a number of paths through a TCP receiver algorithm. The paths may be thought of as a large decision tree with multiple entry points. An incoming TCP segment is routed, via one of the entry points, along a given path according to a classification of the segment, which is based on characteristics of the segment and its underlying connection. Each path defines a sequence of actions to be performed on the TCP segment. For example, a path performs a successive refinement of the classification of a TCP segment, possibly resulting in a segment branching off to another path for further handling. Each path is partitioned into one or more short execution stages, termed subsets.

A module encapsulates a set of actions performed during a given phase of processing the segment, each action being comprised in a subset of the module. Thus, a single path passes through a number of modules as the segment progresses through the receiver. In addition, different paths can pass through the same module, and each path may invoke different functions implemented in a specific subset within the module. Each module is most preferably implemented as a reduced instruction set computer (RISC) processor.

The phases of processing are defined as segment validation, established connection search, established connection context pre-fetch, established connection option parsing, preliminary context processing, final context processing, and connection data positioning Each phase is implemented in a respective module using specific instruction-level optimization. A minimum of necessary information is passed between modules using an efficient inter-module information forwarding method. The modules are coupled together in a distributed pipeline architecture. In addition, there are modules not comprised in the pipeline but which provide support for TCP segment processing, and are coupled to the pipeline: connection establishment and transmitter synchronization.

Unlike other methods known in the art for TCP receiver implementation, in preferred embodiments of the present invention:
TCP receiver logic is mapped to a pipeline architecture designed to take advantage of hardware acceleration capabilities, thus producing a TCP receiver suited to the multi gigabit network environment;
Incoming TCP segments pass through one or more well-defined paths through the TCP receiver algorithm, based on an optimized system of classification according to characteristics of the segment and the underlying connection;
Optimal use of processor resources is facilitated, by partitioning the TCP receiver processing into phases implemented in modules using specific instruction-level optimization;
Modules containing autonomous subsets of operations are coupled together in a distributed pipeline architecture, maximizing parallel processing capabilities;
Information is transferred between modules using an efficient inter-module information forwarding mechanism, streamlining parameter passing by avoiding traditional data load/store overhead; and
A fast internal memory for connection context information, interfaced to an external memory containing a database of established connection control blocks is coupled to the modules in the pipeline so as to minimize time expended on searching and retrieving connection information, thereby further accelerating handling of the TCP segments.

There is therefore provided, according to a preferred embodiment of the present invention, a transport protocol receiver for receiving a packet from a network, the packet having a header, payload, and connection context, the receiver including:
an analysis engine, coupled to receive the packet from the network and adapted to parse and validate the header, locate the connection context, and generate a classification of the header;
a context processing engine, coupled to the analysis engine, and adapted to evaluate and update the connection context, responsive to the classification; and
a data dispatch engine, coupled to the analysis engine and the context processing engine, and adapted to convey the payload to a destination, responsive to the connection context, such that the analysis engine, the context processing engine, and the data dispatch engine operate substantially asynchronously.

Preferably, the analysis engine includes one or more hardware validation processors which parse and validate the header, and one or more hardware connection context processors which locate the connection context and generate the classification of the header responsive to the parsing and validation of the header.

Preferably, the context processing engine includes a hardware preliminary context processing processor which performs an initial evaluation of the connection context and a hardware final context processing processor which performs a final evaluation of the connection context responsive to the initial evaluation.

Preferably, the receiver includes a fast access memory, wherein the analysis engine is adapted to transfer an established connection context from an external memory to the fast access memory, and wherein the context processing engine is adapted to access the fast access memory and evaluate and update the connection context responsive to the established connection context.

Preferably, the analysis engine is adapted to accelerate processing of the packet, and is adapted to extract the packet to a host wherein the packet is handled by a software implementation of the transport protocol, responsive to the connection context not being marked for acceleration.

Preferably, the receiver includes a synchronization module, wherein the context processing engine is adapted to instruct the synchronization module to remove a connection responsive to the connection context.

Preferably, the analysis engine, the context processing engine, and the data dispatch engine respectively include one or more subsets, wherein each subset includes a pre-defined execution unit included within the respective engine.

Further preferably, the one or more subsets included in the context processing engine are operative responsive to the header and the one or more subsets included in the analysis engine.

Further preferably, the one or more subsets included in the data dispatch engine are operative responsive to the header and the one or more subsets included in the context processing engine.

Preferably, the header is transferred through at least part of the analysis engine and the context processing engine substantially without action by the at least part of the analysis engine and the context processing engine responsive to the pre-defined execution unit.

Preferably, the header is transferred through at least part of the context processing engine substantially without action by the at least part of the context processing engine responsive to the pre-defined execution unit.

Preferably, the analysis engine, the context processing engine, and the data dispatch engine respectively include at least one reduced instruction set computer (RISC) processor.

Further preferably, the at least one RISC processor includes a first RISC processor and a second RISC processor, wherein the first and second processors are coupled by a forwarding data bus, and wherein an output register in the first processor acts as an input register to the second processor.

Preferably, the at least one RISC processor includes a first set of registers and a second set of registers, the sets being adapted to be coupled to a forwarding data bus, the at least one RISC processor toggling the first and second sets in alternation between a first state wherein the first register is coupled to the bus and the second register is operated on by the at least one RISC processor, and a second state wherein the first register is operated on by the at least one RISC processor and the second register is coupled to the bus.

There is further provided, according to a preferred embodiment of the present invention, a transport protocol receiver accelerator for disposing of a packet received on a network, including:
 a first processor, adapted to perform a first stage of processing on the packet during a first period of time, so as to generate a classification responsive to data in a packet header;
 a second processor, adapted to perform a second stage of processing on the packet during a second period of time independent of the first period of time, responsive to the classification; and
 a forwarding data bus coupled between the first and second processors, so as to convey the classification from the first processor to the second processor.

Preferably, the classification includes an event, wherein the event acts as a trigger initiating operation of the second processor.

Preferably, the first processor includes first logic adapted to execute a first stage of processing on the packet and wherein the second processor includes second logic adapted to execute a second stage of processing on the packet, wherein the first stage and the second stage are selected from an accelerated stage and a non-accelerated stage.

Preferably, the second stage of processing determines a routing of the packet to a subsequent stage of processing.

There is further provided, according to a preferred embodiment of the present invention, a transport protocol processor for receiving a packet from a network, the packet having a header in accordance with a transport protocol, the processor including:
 a plurality of accelerated stages coupled in a pipeline and adapted to perform successive, respective classifications of the header;
 a plurality of non-accelerated stages, adapted to receive and process the header responsive to the classifications, such that the accelerated and non-accelerated stages together perform substantially all steps required to process the header in accordance with the transport protocol; and
 routing logic, coupled to each of the accelerated stages, implemented to convey the header, following each of the stages, to a next stage selected from the accelerated stages and non-accelerated stages.

There is further provided, according to a preferred embodiment of the present invention, a method for receiving a packet from a network, the packet having a header, payload, and connection context in accordance with a transport protocol, including:
 receiving the packet in an analysis engine which is coupled to the network;
 parsing, validating, and generating a classification of the header in the analysis engine;
 locating the connection context in the analysis engine;
 evaluating and updating the connection context in a context processing engine, responsive to the classification; and
 conveying the payload to a destination, responsive to the connection context, from a data dispatch engine coupled to the analysis engine and the context processing engine, so that the analysis engine, the context processing engine, and the data dispatch engine operate substantially asynchronously.

Preferably, the analysis engine includes one or more hardware validation processors which parse and validate the header, and one or more hardware connection context processors which locate the connection context and generate the classification of the header responsive to the parsing and validation of the header.

Preferably, the context processing engine includes a hardware preliminary context processing processor which performs an initial evaluation of the connection context and a hardware final context processing processor which performs a final evaluation of the connection context responsive to the initial evaluation.

Preferably, the method includes providing a fast access memory, wherein the analysis engine is adapted to transfer an established connection context from an external memory to the fast access memory, and wherein the context processing engine is adapted to access the fast access memory and evaluate and update the connection context responsive to the established connection context.

Preferably, the analysis engine is adapted to accelerate processing of the packet, and is adapted to extract the packet to a host wherein the packet is handled by a software implementation of the transport protocol, responsive to the connection context not being marked for acceleration.

Preferably, the method includes the context processing engine instructing a synchronization module to remove a connection responsive to the connection context.

Preferably, the analysis engine, the context processing engine, and the data dispatch engine respectively include one or more subsets, wherein each subset includes a pre-defined execution unit included within the respective engine.

Further preferably, the one or more subsets included in the context processing engine are operative responsive to the header and the one or more subsets included in the analysis engine.

Preferably, the one or more subsets included in the data dispatch engine are operative responsive to the header and the one or more subsets included in the context processing engine.

Further preferably, the method includes transferring the header through at least part of the analysis engine and the context processing engine substantially without action by the at least part of the analysis engine and the context processing engine responsive to the pre-defined execution unit.

Further preferably, the method includes transferring the header through at least part of the context processing engine substantially without action by the at least part of the context processing engine responsive to the pre-defined execution unit.

Preferably, the analysis engine, the context processing engine, and the data dispatch engine respectively include at least one reduced instruction set computer (RISC) processor.

Further preferably, the at least one RISC processor includes a first RISC processor and a second RISC processor, and the method preferably includes coupling the first and second processors by a forwarding data bus, and wherein an output register in the first processor acts as an input register to the second processor.

Further preferably, the at least one RISC processor includes a first set of registers and a second set of registers, the sets being adapted to be coupled to a forwarding data bus, and preferably the method includes toggling the first and second sets in alternation between a first state wherein the first register is coupled to the bus and the second register is operated on by the at least one RISC processor, and a second state wherein the first register is operated on by the at least one RISC processor and the second register is coupled to the bus.

There is further provided, according to a preferred embodiment of the present invention, a method for disposing of a packet received from a network, including:
performing in a first processor a first stage of processing on the packet during a first period of time, so as to generate a classification responsive to data in a packet header;
performing in a second processor a second stage of processing on the packet during a second period of time independent of the first period of time, responsive to the classification; and
conveying the classification from the first processor to the second processor via a forwarding data bus coupled to the first and second processors.

Preferably, the classification includes an event, and including triggering initiation of operation of the second processor responsive to the event.

Preferably, the first processor includes first logic adapted to execute a first stage of processing on the packet and wherein the second processor includes second logic adapted to execute a second stage of processing on the packet, wherein the first stage and the second stage are selected from an accelerated stage and a non-accelerated stage.

Further preferably, the second stage of processing determines a routing of the packet to a subsequent stage of processing.

There is further provided, according to a preferred embodiment of the present invention, a method for receiving a packet from a network, the packet having a header in accordance with a transport protocol, the processor including:
providing a plurality of accelerated stages coupled in a pipeline and adapted to perform successive, respective classifications of the header;
providing a plurality of non-accelerated stages, adapted to receive and process the header responsive to the classifications, such that the accelerated and non-accelerated stages together perform substantially all steps required to process the header in accordance with the transport protocol; and
conveying the header, following each of the stages, to a next stage selected from the accelerated stages and non-accelerated stages, by routing logic coupled to each of the accelerated stages.

The present invention will be more fully understood from the following detailed description of the preferred embodiments thereof, taken together with the drawings, in which:

DETAILED DESCRIPTION OF THE INVENTION

Figure 2:
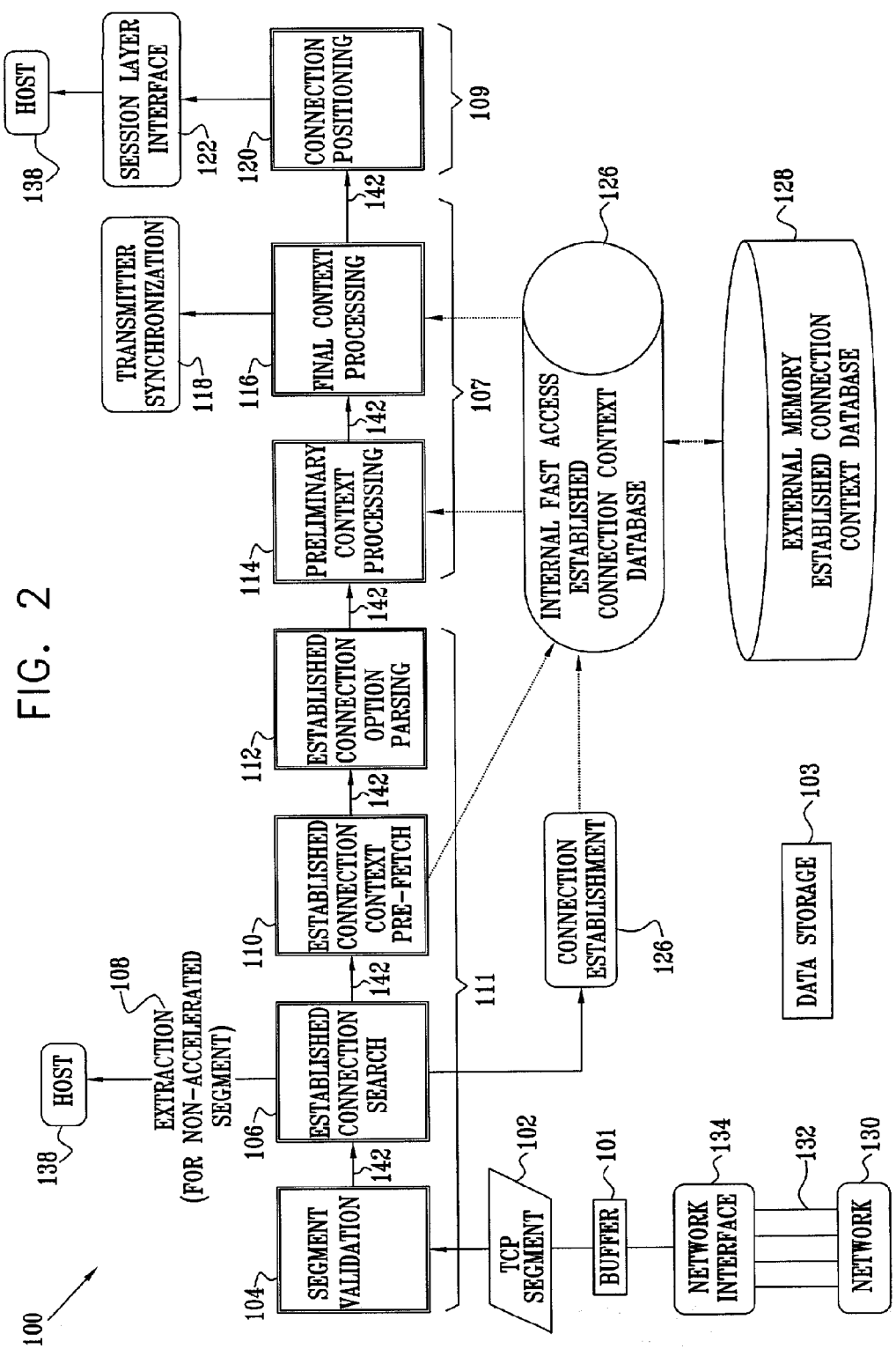
FIG. 2 is a schematic block diagram depicting modules in a distributed pipeline, according to a preferred embodiment of the present invention.

Reference is now made to FIG. 2, which is a schematic block diagram depicting modules in a distributed pipeline 100 for hardware acceleration of TCP receiver processing, according to a preferred embodiment of the present invention. In the context of the present patent application and in the claims, the following definitions apply. The term "module" is defined as a hardware implementation of a stage of a TCP receiver pipeline. The term "subset" is defined as a short execution unit comprised within a module. The term "path" is defined as an ordered sequence of subsets defining a handling for a class of segments.

An efficient implementation of the TCP receiver processing requires a hardware-oriented approach to the classification and routing of the segments. As described in more detail below, such an approach comprises distributing the classification process among a plurality of modules, so as to achieve a successive refinement of the classification. The successively-refined classification is translated to the transfer of commands and parameters between the modules using an efficient inter-module information forwarding mechanism. As described in more detail below, each of the modules acts as a data processing engine, and combinations of modules may also be considered as an engine.

Pipeline 100 is coupled to a network 130 using a network interface 134. The network interface is capable of handling one or more connections 132, the connections comprising logical communication channels between two ports in a TCP network. A TCP segment 102 is temporarily stored in a DRAM buffer 101 before being conveyed to the pipeline via network interface 134. According to a preferred embodiment of the present invention, pipeline 100 comprises seven stages of processing, each stage being implemented in a separate module. Buffer 101, together with input queue buffers in each of the separate modules, is used as a method for backward flow control. The control activates when a specific module has not completed its operations before another segment header is ready for the module. The module accumulates headers in its queue buffer, until the buffer is full, at which point the queueing begins propagating back along the pipeline, so that eventually packets begin to be queued in buffer 101.

One or more modules are preferably implemented as a custom or semi-custom device, for example as an application specific integrated circuit (ASIC), and multiple modules may be provided on a single integrated circuit chip. Modules are most preferably implemented as Reduced Instruction Set Computer (RISC) based processing engines. Each engine is implemented according to subsets comprised in the module of the respective engine.

TCP segment 102, comprising a header and a payload, is handled by a first module in the pipeline, segment-validation module 104, which performs validation operations on the TCP header, for example, verifying the TCP checksum and header length. While the header of segment 102 is processed by pipeline 100, initially in module 104, the payload from the segment is stored in a data storage buffer 103. The segment-validation module also evaluates the TCP header, and forwards commands and parameters responsive to the existence of control flags and TCP options in the TCP header to an established-connection-search module 106. A more detailed description of subsets comprise in each module in pipeline 100 is given below, with reference to FIG. 3, and also with reference to tables I-VII.

Established-connection-search module 106 analyzes the header and determines whether an established connection exists for the segment. If an established connection does not exist, the segment is forwarded to a connection-establishment module 124, external to the pipeline and described below, which is a slow path coupled to the pipeline. If an established connection exists, the established-connection-search module determines if the connection was marked for acceleration by a host 138 during a configuration phase prior to connection establishment. Segments arriving on connections not marked for acceleration pass to an extraction step 108 in the host, outside of the pipeline. The host handles such segments in a software implementation of TCP, typically comprised in the host operating system. In a case where a connection exists and is marked for acceleration, handling of the segment passes to an established-connection-context-pre-fetch module 110.

Since a TCP receiver can handle a potentially large number of connections, pipeline 100 makes use of two types of databases of connection information, known in the art as connection contexts. A first type is an established connection context database in a memory 128, external to pipeline 100. External memory 128 comprises control information for all existing connections. However, since access to external memory is slow, connection contexts needed in one or more pipeline modules are transferred to an established connection context database in an internal fast access memory 126, preferably in an on-chip memory comprised within pipeline 100. The established connection context database in fast access memory 126 is typically smaller than the database in external memory, and provides efficient access to information in immediate demand. Established-connection-context-pre-fetch module 110 performs the transfer of connection context data from external memory database 128 to internal fast access memory database 126, for the connection identified in the established-connection-search module, so that information regarding the connection is available on a fast access basis to later modules in pipeline 100.

Fast access memory 126 is most preferably implemented substantially as described in U.S. patent application Ser. No. 10/134,461, which is assigned to the assignee of the present invention and which is incorporated herein by reference. Alternatively, memory 126 is implemented by any fast access memory process known in the art.

Using information forwarded by segment-validation 104, an established-connection-option-parsing module 112 parses the TCP header and translates Selective Acknowledgment (SACK) and Timestamp (TS) options (described in more detail in the Background of the Invention) into a convenient format for later processing. Since a number of option combinations are possible, the established-connection-option-parsing module generates a command code corresponding to each combination, and forwards the command code and other option-related parameters to a next module in the pipeline, a preliminary-context-processing module 114.

Modules 104, 106, 110, and 112 comprise modules which may be considered as an engine 111 performing an initial analysis on the header of a received packet.

Preliminary-context-processing module 114 handles the TCP options parsed, according to the command code received from the established-connection-option-parsing module. For example, for the TS option, preliminary-context-processing module 114 performs actions specified in RFC 1323, including performing a protection against wrapped sequence numbers (PAWS) test and updating timestamp variables. In addition, preliminary-context-processing module 114 verifies sequence number order by comparing a received sequence number with an expected sequence number. Most preferably, the method for comparison is substantially as described in U.S. provisional application 60/317,647, which is assigned to the assignee of the present patent application, and which is incorporated herein by reference. Alternatively, the comparison is performed by any method known in the art. Based on this comparison, module 114 handles both in-order and out-of-order data by determining further operations to be performed and conveying an indication of these operations together with data and acknowledgment sequence numbers, received advertised window (i.e., a range of sequence numbers the data receiver is currently prepared to accept), and reset (RST), final data (FIN), and push (PSH) flags to a final-context-processing module 116. In performing at least some of its operations, preliminary-context-processing module 114 accesses connection context information in internal fast access database 126.

Figure 1:
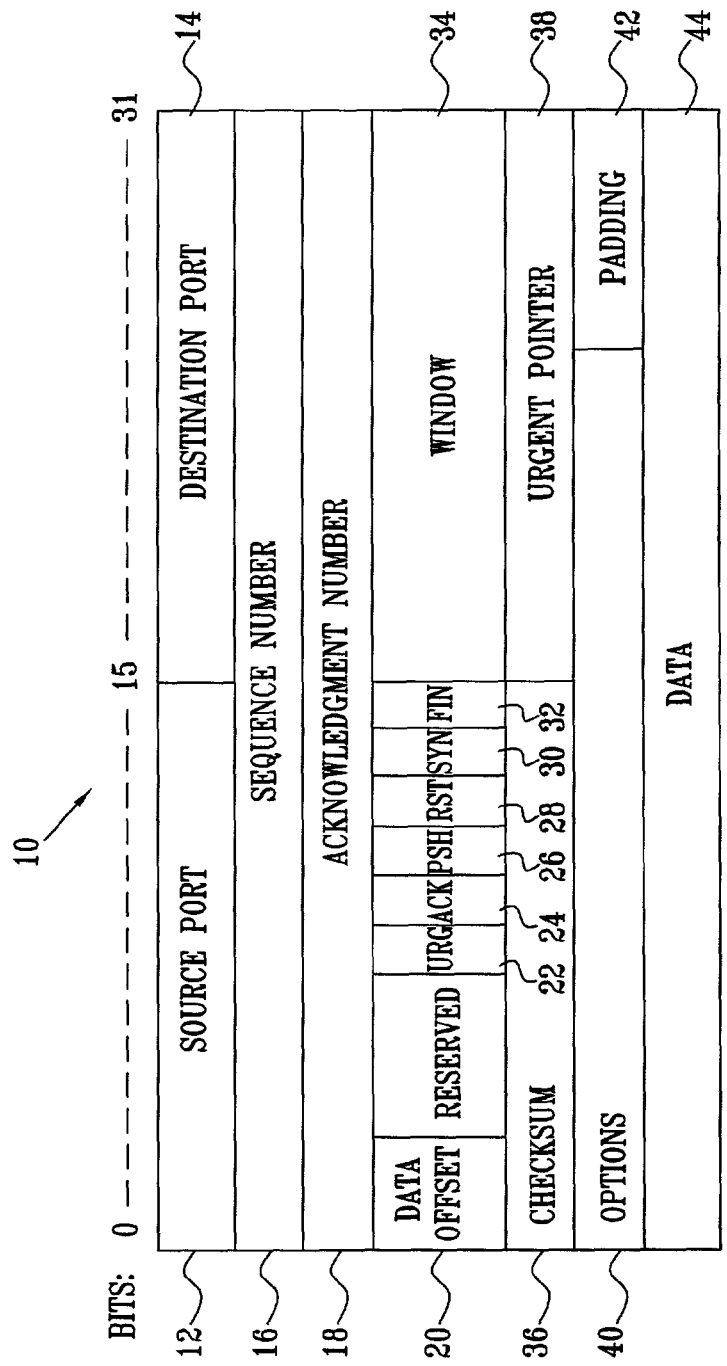
FIG. 1 is a schematic block diagram depicting a structure of a Transmission Control Protocol (TCP) segment header, as is known in the art.

Final-context-processing module 116 handles TCP synchronization actions, comprising actions directed by one or more flags in the TCP header. Actions invoked by flags in the TCP header are described above in reference to FIG. 1 of the Background of the Invention. For example, if the TCP header comprises a RST flag, indicative of a request to reset the underlying connection, final-context-processing module 116 signals a process transmitter synchronization module 118, outside of the pipeline, instructing it to remove a connection. The RST and FIN flags both cause connection state switching, making use of access to internal fast access connection context database 126.

Modules 114 and 116 comprise modules which may be considered as an engine 107 that processes context of the header of a received packet.

The pipeline terminates in a connection-data-positioning module 120, which retrieves the TCP payload from data storage 103 and routes it to host 138 via a session layer interface 122. The connection-data-positioning module handles in-order and out-of-order segments, using information forwarded by preliminary-context-processing module 114 In addition, connection-data-position module 120 notifies host 138 of the arrival of data according to criteria such as time out, buffer full, and a host request for notification after every receipt of a given number of bytes. Module 120 may be considered as a data dispatch engine 109 which conveys the TCP payload to its destination.

Figure 3A:
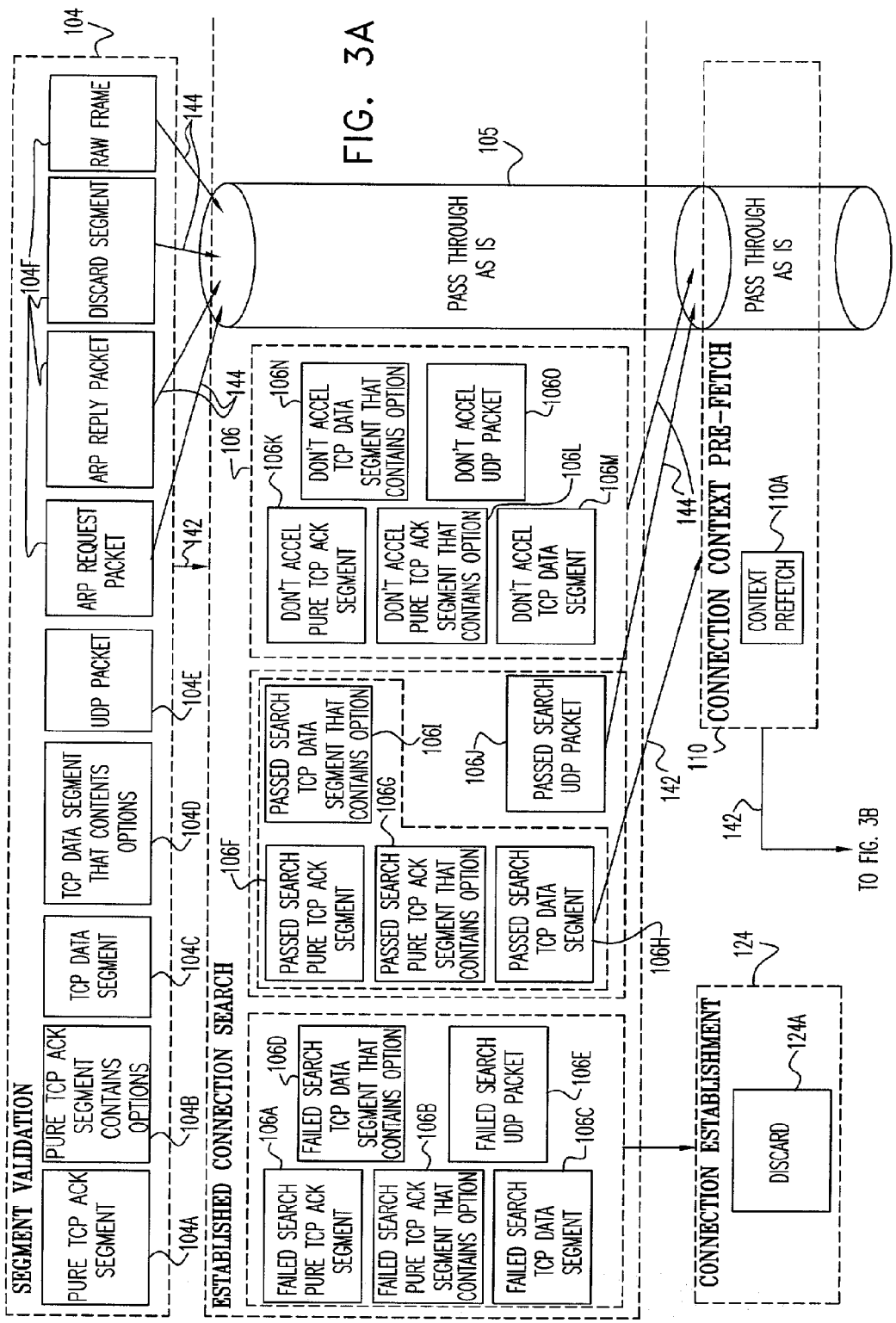
FIGS. 3A and 3B show subsets of the modules of the pipeline of FIG. 2, according to a preferred embodiment of the present invention.
Figure 3B:
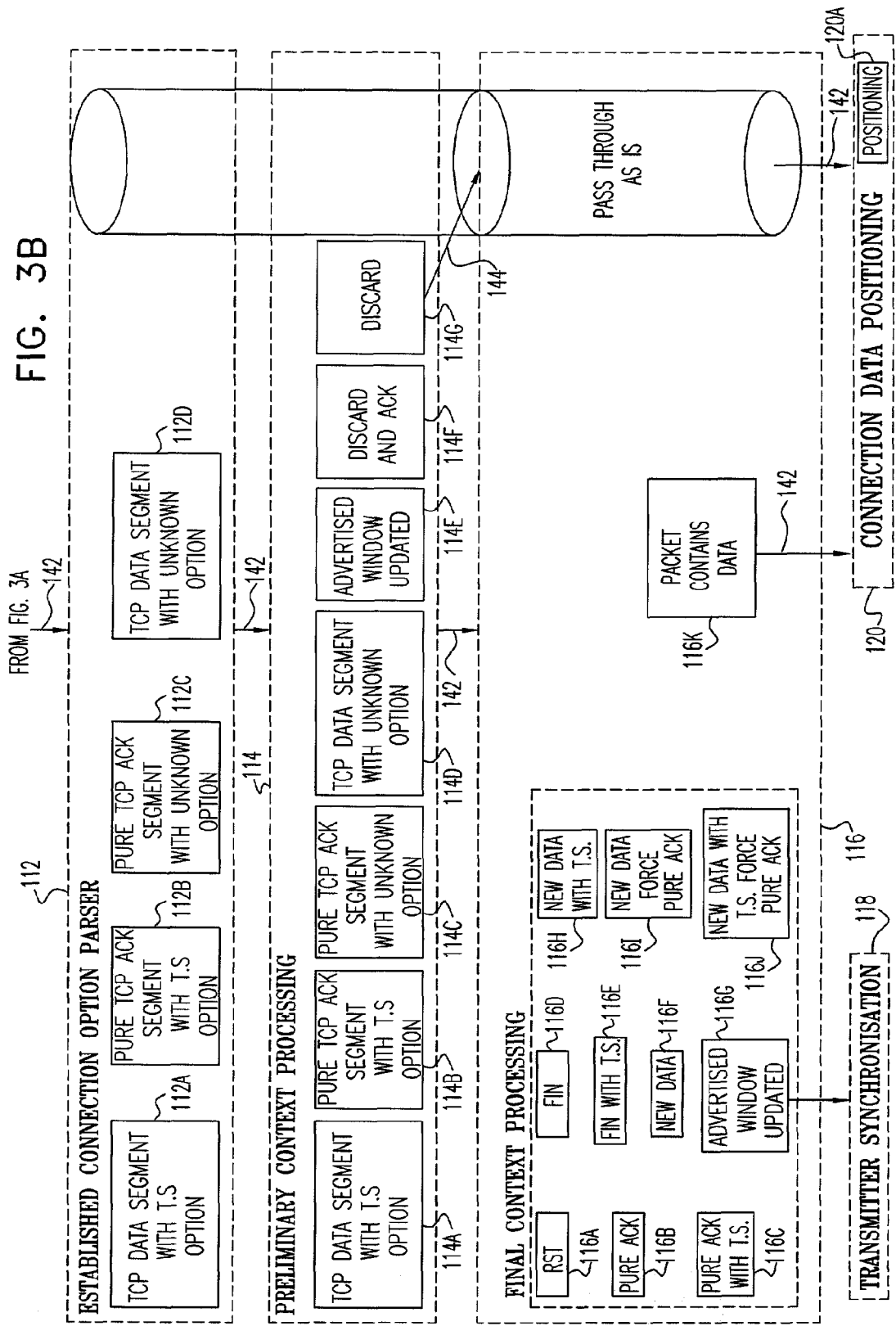

FIGS. 3A and 3B show subsets of the modules of pipeline 100, according to a preferred embodiment of the present invention. The figures also shows paths between modules, and paths through a "virtual conduit" 105 comprised in pipeline 100. Each subset implements a unit of processing on a class of messages. The subsets are identified in FIGS. 3A and 3B, and in tables below, by suffixes to respective module identifiers. As segments traverse pipeline 100, those that are marked for no further action are "transferred" to conduit 105, indicating that these segments pass to the end of the pipeline without action from subsequent modules. The modules, when processing a segment, act as an acceleration stage that accelerates the processing. On transfer to conduit 105, the modules act to pass the segment through remaining modules without acceleration.

Information transferred between modules is depicted as arrows 142, when the subsequent module is to be utilized. Information transferred between modules when subsequent module(s) perform no action is depicted as arrows 144. Completion of processing in each module effectively acts as an event which triggers operation of a subsequent module, so that information represented by arrows 142 and 144 may also be considered to comprise events.

Tables I through VII below present a description of the subsets comprised in modules 104, 106, 110, 112, 114, 116, and 120 respectively. Where applicable, additional conditions are shown by which a refinement of the classification of the message is performed (e.g., in Table II). It will be apparent to those skilled in the art that the partition to subsets presented is one of a number of similar partitions possible in preferred embodiments of the present invention.

Table I shows the subsets comprised in segment-validation module 104:

TABLE I

| Subset ID | Subset Description |
|---|---|
| 104A | TCP ACK segment containing no options |
| 104B | TCP ACK segment containing options |
| 104C | TCP data segment containing no options |
| 104D | TCP data segment containing options |
| 104E | UDP packet |
| 104F | Packets for transfer to conduit 105, comprising ARP request packets, ARP reply packets, and packets which may be considered faulty, such as those with incorrect checksums. |

Table II shows the subsets comprised in established-connection-search module 106:

TABLE II

| Subset ID | Conditions: | Subset Description |
|---|---|---|
| 106A | Connection not found | TCP ACK segment containing no options |
| 106B | | TCP ACK segment containing options |
| 106C | | TCP data segment containing no options |
| 106D | | TCP data segment containing options |
| 106E | | UDP packet |
| 106F | Connection found, segment marked for aceleration | TCP ACK segment containing no options. |
| 106G | Connection found, segment marked for acceleration | TCP ACK segment containing options |
| 106H | Connection found, segment marked for acceleration | TCP data segment containing no options |
| 106I | Connection found, segment marked for acceleration | TCP data segment containing options |
| 106J | Connection found, segment marked for acceleration | UDP packet |
| 106K | Connection found, segment not marked for acceleration | TCP ACK segment containing no options |
| 106L | Connection found, segment not marked for acceleration | TCP ACK segment containing options |
| 106M | Connection found, segment not marked for acceleration | TCP data segment containing no options |
| 106N | Connection found, segment not marked for acceleration | TCP data segment containing options |
| 106O | Connection found, segment not marked for acceleration | UDP packet |

Table III shows the subset comprised in connection-context-pre-fetch module 110:

TABLE III

| Subset ID | Subset Description |
|---|---|
| 110A | Perform connection context pre-fetch |

Table IV shows the subsets comprised in established-connection-option-parser module 112:

TABLE IV

| Subset ID | Subset Description |
|---|---|
| 112A | TCP data segment with timestamp (TS) option |
| 112B | Pure TCP ACK segment with TS option |
| 112C | Pure TCP ACK segment with no options or unknown option(s) |
| 112D | TCP data segment with no opitons or unknown option(s) |

Table V shows the subsets comprised in preliminary-context-processing module 114:

TABLE V

| Subset ID | Subset Description |
|---|---|
| 114A | TCP data segment with timestamp (TS) option |
| 114B | Pure TCP ACK segment with TS option |
| 114C | Pure TCP ACK segment with no options or unknown option(s). |
| 114D | TCP data segment with no options or unknown option(s) |
| 114E | Updates advertised window |
| 114F | Discard and ACK; applies to segments which arrive outside of the window of the receiver. The segment is discarded, but an ACK is setn for resynchronization |
| 114G | Discard; applies to segments failing a PAWS test |

Table VI shows the subsets comprised in final-context-processing module 116:

TABLE VI

| Subset ID | Conditions: | Subset Description |
|---|---|---|
| 116A | Flags and options exist | Reset (RST) handling |
| 116B | " | Pure ACK |
| 116C | " | Pure ACK with TS |
| 116D | " | Final data (FIN) handling |
| 116E | " | FIN with TS |
| 116F | " | New data |
| 116G | " | Updates advertised window |
| 116H | " | New data with TS |
| 116I | " | New data, force pure ACK |
| 116J | " | New data with TS, force pure ACK |
| 116K | | Packet received contains valid data, i.e., the packet is not just for control |

Table VII shows the subset comprised in connection-data-positioning module 120:

TABLE VII

| Subset ID | Subset Description |
|---|---|
| 120A | Connection data positioning |

Using the subsets shown in Tables I through VII above, a number of paths i.e., ordered sequences of subsets defining the handling for a class of segments, through the TCP receiver algorithm may be defined. For example, Table VIII shows a path through pipeline 100 for a matched TCP data segment (i.e., a segment arriving on an established connection), which is designated for acceleration and having a RST flag, with reference to subsets from Tables I through VII, and modules and processes from FIG. 2:

TABLE VIII

| Step | Module | Subset |
|---|---|---|
| 1 | Segment-validation 104 | 104C TCP data segment |
| 2 | Established-connection-search 106 | 106H TCP data segment |
| 3 | Connection-context-pre-fetch 110 | 110A Connection context pre-fetch |
| 4 | Established-connection-option parser 112 | 112D TCP data segment without options or with unknown option(s) |
| 5 | Preliminary-context-processing 114 | 114D TCP data segment with no options or unknown option(s) |
| 6 | Final-context-processing 116 | 116A Reset (RST) handling |
| 7 | | 116F New Data |
| 8 | | Transmitter synchronization 118 |
| 9 | | 116K Packet contains data |
| 10 | Connection-data-positioning module 120 | 120A Connection data positioning |

Similar tables may be constructed to show the mapping of the modules and subsets presented in FIG. 2 and Tables I through VII, to paths through the TCP receiver algorithm. Table IX below presents 10 classifications of segments and connections which correspond to 10 paths through the TCP receiver algorithm, according to a preferred embodiment of the present invention:

TABLE IX

| Path | Classification: |
|---|---|
| 1 | Invalid segments without an established connection |
| 2 | Valid segments without an established connection |
| 3 | Valid segments with an established connection, not marked for acceleration |
| 4 | Valid segments with an established connection, marked for acceleration, with a RST flag |
| 5 | Valid segments with an established connection, marked for acceleration, with a FIN flag. |
| 6 | Valid segments with an established connection, marked for acceleration, with a pure ACK |
| 7 | Valid segments with an established connection, marked for acceleration, with data |
| 8 | Valid segments with an established connection, marked for acceleration, with data and TS |
| 9 | Valid segments with an established connection, marked for acceleration, with a pure ACK and TS |
| 10 | Valid segments with an established connection, marked for acceleration, with out-of-order data |

It will be appreciated that table VIII corresponds to path 4.

Preferably, paths not comprised in Table IX are handled by software which is able to route the segments.

As stated above, information transferred between modules is depicted as arrows 142 and 144. Thus, a segment is checked initially for validity in segment-validation module 104, resulting in a first classification being made of valid and invalid segments, valid segments flowing though subsets 104A, 104B, 104C, 104D, or 104E in Table I. The first classification causes a branching in the routing of the segment, i.e., execution of different subsets of actions in established-connection-search module 106. Next, the segment is checked for belonging to an established connection, resulting in a further set of classifications shown in Table II, based on whether a connection exists and whether a connection is marked for acceleration. Further classifications continue to influence the routing of the segment in subsequent modules, also directing execution of certain subsets comprised in the subsequent modules.

Figure 4:
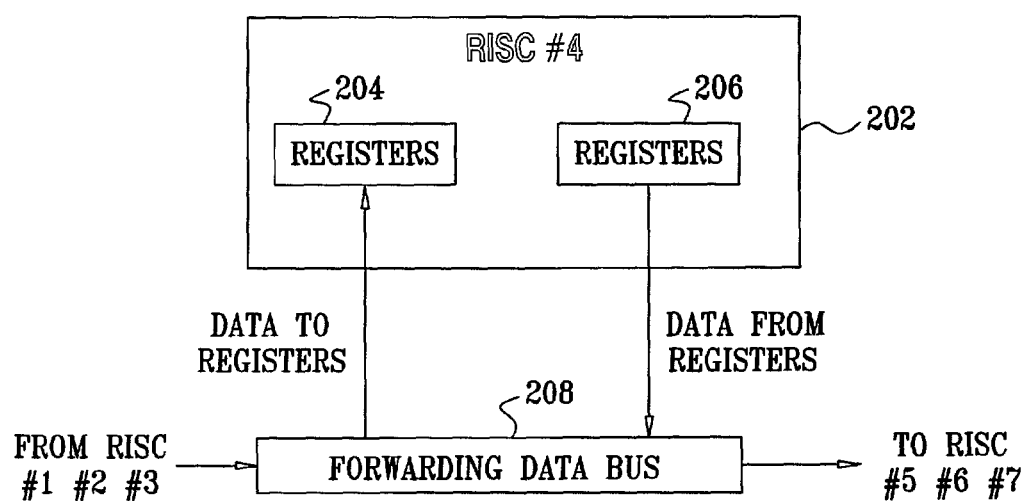
FIG. 4 is a schematic diagram illustrating a process for transferring information between modules of the pipeline of FIG. 2, according to a preferred embodiment of the present invention.

FIG. 4 is a schematic diagram illustrating a process 200 for transferring information between modules of pipeline 100, according to a preferred embodiment of the present invention. Preferred embodiments of the present invention most preferably comprise an efficient method for transferring information between modules, as depicted by arrows 142 and 144. As stated above, each module comprises a RISC processor 202, herein by way of example assumed to be the processor for the fourth module in pipeline 100, i.e., established-connection-option-parsing module 112.

Each processor 202 is implemented to comprise two sets of register files 204, 206, and is coupled to a forwarding data bus 208. Each processor 202 is implemented to operate with one of the sets of files while the other set of register files is available, both for reading and writing, to bus 208. Each processor 202 toggles its sets of register files between an "available-for-operation" state, and an "available-to-the-bus" state.

Thus, when set 204 of RISC processor 202 of module 112 is in its available-to-the-bus state, data in the set may be written to the available-to-the-bus register of the RISC processor of module 114, and may be read from the available-to-the-bus register of the RISC processor of module 110. During this process, RISC processor 202 of module 112 operates with set 206, since these registers are in the available-for-operation state. Using the two sets of registers each RISC processor 202 implements the following steps:

Load all relevant data elements into the available-to-the-bus register;

Toggle the register to be available-for-operation;

Execute a processing routine, according to the data elements, the time of execution having a duration which is dependent on the routine being processed, generating resultant data elements in the register;

Toggle the register to be available-to-the-bus;

Transfer the resultant data via the bus to another of RISC processors 202.

It will be appreciated that by toggling between the two sets of registers, loading and/or storing operations needed to transfer data between RISC processors do not consume cycles of operation of the processors, so that all operation cycles are available for processing the data. Thus, each pair of RISC processors 202, together with the forwarding data bus, act as an accelerator which processes headers received by the first processor 202.

It will be understood that preferred embodiments of the present invention may be implemented substantially as stand-alone devices, such as in a very large scale integrated circuit (VLSI), and/or as devices which are integral to a component peripheral to a computer. For example, pipeline 100 may be integrated within a dedicated networking card, which is coupled to a host processor via an industry-standard bus such as a Peripheral Component Interconnect (PCI) bus.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for processing network information, the method comprising:
classifying, by a processor integrated within a single chip, a header portion of a received packet based on connection context information within said received packet, wherein said connection context information is acquired by said single chip from a memory external to said single chip;
updating, by said processor, said connection context information for said received packet based on said classifying; and
communicating, by said processor, at least a payload portion of said received packet to a destination, based on said updated connection context information.

2. The method according to claim 1, wherein said classifying, updating and communicating are performed asynchronously.

3. The method according to claim 1, comprising parsing said header portion of said received packet.

4. The method according to claim 1, comprising validating said header portion of said received packet.

5. The method according to claim 1, comprising evaluating said connection context information of said received packet.

6. The method according to claim 1, comprising evaluating said updated connection context information.

7. The method according to claim 1, comprising executing said classifying during a first processing stage.

8. The method according to claim 1, comprising executing said classifying at a first processing stage during a first period of time.

9. The method according to claim 8, comprising executing said updating at a second processing stage during a second period of time, said second period of time independent of said first period of time.

10. The method according to claim 1, wherein said connection context information is for an established connection.

11. The method according to claim 10, wherein said memory comprises fast access memory.

12. The method according to claim 1, comprising determining based on said connection context information, whether said received packet is marked for hardware acceleration processing.

13. The method according to claim 12, comprising if said received packet is marked for said hardware acceleration processing, accelerating processing of said received packet.

14. The method according to claim 12, comprising, if said received packet is not marked for said hardware acceleration processing, passing said received packet to a host processor for non-accelerated processing in software.

15. The method according to claim 1, comprising identifying whether a connection is to be removed based on one or more of said connection context information or said updated connection context information.

16. The method according to claim 15, comprising, if said connection is to be removed, instructing a synchronization module integrated within said single chip to remove said connection.

17. The method according to claim 1, wherein said classifying is performed by one or more of an analysis engine or at least one reduced instruction set computer (RISC) processor.

18. The method according to claim 1, wherein said updating is performed by one or more of a context processing engine or at least one reduced instruction set computer (RISC) processor.

19. The method according to claim 1, wherein said communicating is performed by one or more of a data dispatch engine or at least one reduced instruction set computer (RISC) processor.

20. A system for processing network information, the system comprising:
at least one processor within a single chip, said at least one processor enables classifying a header portion of a received packet based on connection context information within said received packet, wherein said at least one processor enables acquiring said connection context information from a memory external to said single chip;
said at least one processor enables updating said connection context information for said received packet based on said classifying; and
said at least one processor enables communicating at least a payload portion of said received packet to a destination, based on said updated connection context information.

21. The system according to claim 20, wherein said at least one processor enables performing said classifying, updating and communicating asynchronously.

22. The system according to claim 20, wherein said at least one processor enables parsing said header portion of said received packet.

23. The system according to claim 20, wherein said at least one processor enables validating said header portion of said received packet.

24. The system according to claim 20, wherein said at least one processor enables evaluating said connection context information of said received packet.

25. The system according to claim 20, wherein said at least one processor enables evaluating said updated connection context information.

26. The system according to claim 20, wherein said at least one processor enables executing said classifying during a first processing stage.

27. The system according to claim 20, wherein said at least one processor enables executing said classifying at a first processing stage during a first period of time.

28. The system according to claim 27, wherein said at least one processor enables executing said updating at a second processing stage during a second period of time, said second period of time independent of said first period of time.

29. The system according to claim 20, wherein said connection context information is for an established connection.

30. The system according to claim 29, wherein said memory comprises fast access memory.

31. The system according to claim 20, wherein said at least one processor enables determining based on said connection context information, whether said received packet is marked for hardware acceleration processing.

32. The system according to claim 31, wherein said at least one processor enables accelerating processing of said received packet, if said received packet is marked for said hardware acceleration processing.

33. The system according to claim 31, wherein said at least one processor enables passing said received packet to a host processor for non-accelerated processing in software, if said received packet is not marked for said hardware acceleration processing.

34. The system according to claim 20, wherein said at least one processor enables identifying whether a connection is to be removed based on one or more of said connection context information or said updated connection context information.

35. The system according to claim 34, wherein said at least one processor enables instructing a synchronization module integrated within said chip to remove said connection, if said connection is to be removed.

36. The system according to claim 20, wherein said at least one processor that enables said classifying comprises one or more of an analysis engine or at least one reduced instruction set computer (RISC) processor.

37. The system according to claim 20, wherein said at least one processor that enables said updating comprises one or more of a context processing engine or at least one reduced instruction set computer (RISC) processor.

38. The system according to claim 20, wherein said at least one processor that enables said communicating comprises one or more of a data dispatch engine or at least one reduced instruction set computer (RISC) processor.

* * * * *